United States Patent [19]

Schepers et al.

[11] Patent Number: 4,721,752
[45] Date of Patent: Jan. 26, 1988

[54] PROCESS FOR PREPARING AN IMPACT-RESISTANT THERMOPLASTIC MOULDING COMPOUND

[75] Inventors: Herman A. J. Schepers, Stein; Wilhelmus A. M. Debets, Sittard, both of Netherlands

[73] Assignee: Stami Carbon BV, Geleen, Netherlands

[21] Appl. No.: 815,636

[22] Filed: Jan. 2, 1986

Related U.S. Application Data

[63] Continuation of Ser. No. 656,464, Oct. 1, 1987, abandoned.

[30] Foreign Application Priority Data

Oct. 1, 1983 [NL] Netherlands ............................ 8303377

[51] Int. Cl.$^4$ ........................ C08L 51/04; C08L 35/06
[52] U.S. Cl. ........................................ 525/74; 525/195; 525/207
[58] Field of Search ............... 525/74, 207, 195, 327.8

[56] References Cited

U.S. PATENT DOCUMENTS

| | | | |
|---|---|---|---|
| 3,859,266 | 1/1975 | Carlos et al. | 525/195 |
| 3,959,405 | 5/1976 | Labana et al. | 525/207 |
| 4,444,950 | 4/1984 | Sakano et al. | 525/74 |
| 4,452,948 | 6/1984 | Marrion et al. | 525/207 |

FOREIGN PATENT DOCUMENTS

| | | | |
|---|---|---|---|
| 3140566 | 4/1983 | Fed. Rep. of Germany | 525/74 |
| 3140565 | 4/1983 | Fed. Rep. of Germany | 525/74 |

*Primary Examiner*—Carman J. Seccuro
*Attorney, Agent, or Firm*—Cushman, Darby & Cushman

[57] ABSTRACT

A process for preparing an impact resistant thermoplastic moulding compound based on a copolymer consisting of styrene and/or α-methylstyrene and maleic anhydride by mixing:

50–95% (wt) of a copolymer consisting of:
 (i) 50–95% (wt) styrene and/or α-methylstyrene,
 (ii) 50–5% (wt) maleic anhydride,
 (iii) 0–20% (wt) acrylate,
 (iv) 0–20% (wt) acrylonitrile;

5–50% (wt) of a rubber modified with hydroxyl groups, a rubber modified with amine groups or a rubber modified with amide groups; and 0–30% (wt) unmodified rubber, said mixing being conducted in the presence of 0.01–10 parts by weight of a reaction accelerator, calculated on 100 parts by weight copolymer and modified rubber, at a temperature between 160° C. and 290° C.

9 Claims, No Drawings

PROCESS FOR PREPARING AN IMPACT-RESISTANT THERMOPLASTIC MOULDING COMPOUND

This is a continuation of application Ser. No. 656,464, filed Oct. 1, 1984, now abandoned.

The present invention relates to a process for preparing a thermoplastic impact resistant moulding compound based on a rubber-modified copolymer based on styrene and/or α-methylstyrene and maleic anhydride.

BACKGROUND OF THE INVENTION

Copolymers from styrene and maleic anhydride are already known (SMA). These copolymers can be prepared by batch processes or in continuous processes. The first commercially available SMA copolymers were low-molecular weight products having molecular weights lower than 5000. These low molecular weight grades were used in, for instance, floor shampoos, floor waxes, emulsion paints and dispersing agents.

In addition, the later developed high-molecular SMA copolymers are important, and are used, for instance, in the automotive industry and in domestic articles.

As a result of the copolymerization of styrene with maleic anhydride, SMA copolymers have a greater dimensional stability under heat than polystyrene and styrene-acrylonitrile copolymers. This may be very advantageous. However, since SMA copolymers have a high softening temperature (approximately 220° C.), it is difficult to process such copolymers through extrusion and injection moulding apparatus and the like. Moreover, the mechanical properties of such copolymers, such as impact resistance, are insufficient since SMA copolymers are very brittle. Incorporating a rubber in a SMA copolymers may improve impact-resistance characteristics while sacrificing other desired properties, such as, for instance, the rigidity of the copolymer.

A number of alleged solutions have already been proposed to overcome problems commonly associated with conventional SMA copolymers. For instance, British Pat. No. 1,315,219 describes mixtures consisting of a (i) copolymer of maleic anhydride, styrene and acrylonitrile, (ii) a copolymer from styrene and acrylonitrile and (iii) a graft copolymer of a mixture from styrene and acrylonitrile grafted on a rubber.

Another effort is described in British Pat. No. 1,316,330 as a mixture of a styrene-acrylonitrile copolymer with a styrene-maleic anhydride-acrylonitrile copolymer.

Another approach is described in U.S. Pat. No. 3,322,853 as a mixture consisting of a graft copolymer comprising a diene rubber substrate and hydroxylated substrate, a styrene-maleic anhydride copolymer having a low molecular weight and a polyepoxide. This mixture is composed of diene rubbers and polyepoxides and is used as a coating or adhesive. The UV resistance and oxidation stability of such a mixture are quite unsatisfactory.

Next, a still further proposal is disclosed in German patent application No. 3,140,565 now laid open for public inspection, which discloses a moulding compound consisting of 50 to 90% (wt) of a copolymer which consists of 65 to 90% (wt) of a monovinylaromatic monomer, 5 to 35% (wt) of an unsaturated dicarboxylic anhydride and of 10 to 50% (wt) of a rubber composed from a monomer from the group of the conjugated dienes, alkylacrylates, monovinyl aromatics, vinyl ethers of ethylene, propylene and a non-conjugated diene and further an ethyl-unsaturated monomer with an —OH, —SH or —NHR group. This moulding compound, however, has an undesirably low impact resistance.

SUMMARY AND OBJECTS OF THE INVENTION

The process according to the invention are broadly characterized as comprising mixing, i.e. blending, (i) 50–95 wt. % of a copolymer based on styrene and/or α-methylstyrene-maleic anhydride, (ii) 5–50 wt. % of a modified ethylene-propylene rubber, or ethylene-propylene-diene rubber, and (iii) 0–30 wt. % of an ethylene-propylene rubber or ethylene-propylene-diene rubber in the presence of a reaction accelerator at a temperature of about 160° C. to about 290° C.

The present invention provides a process for producing a thermoplastic moulding compound based on a rubber-modified copolymer of styrene and/or α-methylstyrene and maleic anhydride which compound has, for instance, high impact resistance, superior UV resistance, superior oxidation stability, and high thermal stability. This process thus provides a composition essentially overcoming defects associated with conventional SMA copolymer based thermoplastic moulding compositions.

The inventive process also provides an object wholly or partly produced from a moulding compound as described above.

DETAILED DESCRIPTION

The present process comprises mixing, i.e. blending:
A. about 50 to about 95 wt. % of a copolymer consisting of:
  (i) about 50 to about 95 wt. % styrene and/or α-methylstyrene
  (ii) about 50 to about 5 wt. % maleic anhydride
  (iii) 0 to about 20 wt. % acrylate
  (iv) 0 to about 20 wt. % acrylonitrile;
B. about 5 to about 50 wt. % of an ethylene-propylene rubber or ethylene-propylene-diene rubber modified by grafting with a compound containing hydroxyl, amide or amine groups; and
C. 0 to about 30 wt. % of an unmodified ethylene-propylene rubber or ethylene-propylene-diene rubber in the presence of about 0.01 to about 10 parts by weight of a reaction accelerator, calculated on 100 parts by weight copolymer plus modified rubber, at a temperature ranging between about 160° C. to about 290° C.

Conventional additives such as stabilizers, antioxidants, antistatics, lubricants, fillers, colourants, pigments, and the like may be added during the processing.

Surprisingly and quite unexpectedly, it has been found that, in addition to a good UV resistance, such a moulding compound also has an excellent impact resistance, dimensional stability under heat and rigidity. Moreover, it is now possible to use an ethylene-propylene rubber or an ethylene-propylene-diene rubber which can be produced in large scale quantity after only minor modifications.

Unexpectedly, the use of EP or EPT rubbers with non-conjugated dienes, rubbers with few or no unsaturations in the main chain in the present process, provides mixtures according to the invention having superior UV resistance and oxidation stability.

In the process, the mixture preferably contains about 65 to about 95 wt. % of the copolymer and about 5 to about 35 wt. % of the modified rubber.

The copolymer based on styrene and/or α-methylstyrene and maleic anhydride consists of:
(i) about 50 to about 95 wt. % styrene and/or α-methylstyrene,
(ii) about 50 to about 5 wt. % maleic anhydride,
(iii) 0 to about 20 wt. % acrylate, and
(iv) 0 to about 20 wt. % acrylonitrile.

Preferably, the copolymer contains 65–90% (wt) styrene and/or α-methylstyrene, and 10–35% (wt) maleic anhydride.

The copolymers used in the invention have a weight-average molecular weight between about 30,000 and about 500,000 and preferably between about 100,000 and about 400,000. The weight average molecular weight ($\overline{M}_w$) can be determined in accordance with a method described in Journal of Applied Polymer Science, Vol. 20, 1619–1626 (1976), the disclosure of which is hereby incorporated by reference. A method has been developed for determining the weight average molecular weight ($=\overline{M}_w$) by a single calibration curve by determining the intrinsic viscosity at 25.0° C. in tetrahydrofuran). For maleic anhydride percentages of 5–50 moles % and an $\overline{M}_w$ range of $2 \times 10^4$ to $7 \times 10^6$, the following equation is applicable:

$$\eta = 3.98 \cdot 10^{-4} \cdot \overline{M}_w^{0.596}$$

where:
$\eta$ = intrinsic viscosity
$\overline{M}_w$ = weight average molecular weight.

The copolymers of styrene and/or α-methylstyrene and maleic anhydride are known and are generally described in available literature. The copolymers are prepared according to customary processes such as mass polymerization or polymerization in solution. These copolymers of styrene and maleic anhydride can, for instance, be obtained by reacting the two monomers, styrene and maleic anhdyride, with each other in the presence of benzoyl peroxide. The polymerization rate can be controlled much better when a solvent is used. Suitable exemplary solvents include, for instance, acetone, toluene, xylene, dioxane or methyl ethyl ketone.

A 50:50 (molar-copolymer can be obtained by discontinuous copolymerization of styrene and maleic anhydride, for instance by precipitation polymerization of styrene and maleic anhydride in aromatic solvents. Copolymers having less maleic anhydride can be obtained in a continuous copolymerization process if an amount of a mixture composed of excess styrene to maleic anhydride is fed at high temperatures into a polymerization vessel with vigorous stirring while simultaneously removing a little quantity of polymerization mixture from the vessel. The disclosure of A. W. Hanson and R. L. Zimmermann, Industrial Engineering Chemistry 49, page 1803, 1957, is hereby incorporated by reference.

For a terpolymer, the styrene-maleic anhydride copolymer may contain 0 to about 20% (wt) acrylonitrile or an acrylate such as, for instance, methyl methacrylate or ethyl acrylate. The terpolymer preferably contains a minimum of 5% (wt) acrylonitrile or acrylate.

In principle, all rubbers modified with hydroxyl groups can be used in the present process. Suitable rubbers which can be used have few or no unsaturations in their main chain, i.e. contain fewer than 2 and preferably fewer than 1.5 double bonds per 1000 carbon atoms. As rubbery largely saturated polymers, the rubbers may be branched or have side chains which can be employed for crosslinking purposes.

Particularly suitable rubbers useful in the process for preparing the compositions are ethylene-propylene copolymers (the so-called EP rubbers) and preferably ethylene-propylene copolymers copolymerized with other polyunsaturated monomers (the so-called EPT rubbers), or mixtures of two or more of these rubbers. Examples of suitable polyunsaturated monomers include hexadiene-1,4 dicyclopentadiene, tricyclopentadiene, 5-vinylnorbornene-2, 5-ethylidene-norbornene-2, 5-methylene-norbornene-2, 5-(2-propenyl)norbornene-2, 5-(5-hexenyl)norbornene-2, 4,7,8,9-tetrahydroindene and sipropylidenetetrahydroindene. The preparation of exemplary rubbers is described in laid open Netherlands patent application Nos. 6806893 and 300585, the disclosures of which are hereby incorporated by reference.

Other rubbers include, for instance, polyacrylate, polybutylene, polyethylenevinyl-acetate, polybutadiene or mixtures thereof.

The rubbers are modified with hydroxyl groups, amide groups or amine groups. Hydroxyl groups, for instance, may be incorporated in the rubber via a number of processes.

For instance, the hydroxyl groups may be incorporated in the ethylene-propylene or ethylene-propylenediene rubbers by grafting the rubber with a hydroxyl functional monomer, such as 2-hydroxyethylacrylate, 2-hydroxypropyl-acrylate and the corresponding methacrylates, alcohols, such as allylalcohol and vinylbenzylalcohol.

The hydroxyl groups can also be incorporated in the rubbers by copolymerization of suitable monomers or by chemical modification of the polymer. Incorporating functional groups via copolymerization can be effected in an emulsion-free radical polymerization system while the incorporation of the functional groups by chemical modification can be effected with polymers prepared by emulsion-free radical polymerization. Examples of copolymerizable monomers include hydroxyethylmethacrylate, hydroxyethylacrylate, hydroxypropylacrylate or methacrylate, hydroxypropylcrotonate, di(2-hydroxyethyl)maleate, di(2-hydroxyethyl) fumarate, N-ethanolacrylamide, hydroxyethylvinyl ether and diethyleneglycolmonovinylether. A suitable chemical modification may comprise a partial epoxidation, followed by reduction of carbon-carbon double bonds in a polymer containing an unsaturation, treatment with an alkalimetalalkyl compound, such as butyllithium, followed by hydrolysis, and hydrolysis of halogen groups in a polymer molecule.

Other exemplary means for incorporating hydroxyl groups in a rubber include esterifications of a carboxyl-functional polymer such as ethylene-propylene-acrylate terpolymer with a diol and oxidation of EPT to a 1,2 diol.

Preferably an ethylene-propylene-diene rubber is modified with hydroxyl groups by grafting 2-hydroxyethylmethacrylate (HEMA) in a 10%-xylene solution of the EPT rubber. The number of OH-groups in the EP to EPT rubber is generally more than 0.01% (wt) preferably 0.05 to 10% (wt) (calculated on the modified EP or EPT rubber). EPT rubbers with different HEMA percentages can be obtained by varying the HEMA concentrations or by using different grafting times. The resulting product is subsequently purified by, for instance, extraction.

The number of amine groups in the EP or EPT rubber is generally from 0.05 to 10% (wt). The number of amide groups in the EP or EPT rubber is generally 0.05 to 10% (wt).

The modified EP or EPT rubber can be mixed with the SMA matrix in a conventional mixing device such as, for example, a single or twin-screw extruder, an impeller mixer, a Banbury mixer, or in roll mills.

0–30% (wt) of an ethylene-propylene or ethylene-propylene-diene rubber can be added.

Advantageously, about 5 wt % to about 20 wt % of such rubbers are employed.

The reaction accelerator used in the present process, is preferably an organic metal compound. The reaction accelerator used is an organic metal compound. Preferably an organo metal compound is used which is capable of good distribution in a molten polymer. Organo metal compounds of metals from groups II, III and IV are exemplary. Examples of suitable reaction accelerators are salts of a metal from groups II and III and a saturated or unsaturated fatty acid having 10–20 carbon atoms such examples include, for instance, magnesium stearate, calcium stearate, zinc stearate, aluminum stearate, cadmium stearate and/or barium stearate. Other suitable reaction accelerators include organo metal compounds of a metal from group IV and an oxygen containing organic compound such as dibityltinmaleate and/or tetrabutoxy titanium. Also applicable are carboxyl groups containing polymers wherein the carboxyl groups are neutralized partly or completely with metal ions of metals from groups II and III such examples include, for instance, copolymers of ethylene and acrylic acid partly or completely neutralized with, for example, zinc.

The present moulding compounds are suitable for many applications. Such as, for instance, the manufacture of tubes, bottles, furniture, dashboards for motor cars, casings and housing for electronic and domestic devices, shoe heels, caravans, skis and surf boards.

The invention is further elucidated by means of the following non-limiting examples and comparative experiments.

EXAMPLES

Examples 1 through 9 and Comparative Examples

The following were supplied to a roll mill consisting of two rolls, diameter 80 mm and width 200 mm, with a friction of 1:1.2. 45 parts by weight SMA (MA content 14 wt. % and $\overline{M}_w$ 250,000), 15 parts by weight OH-modified EPT, 0.2 parts by weight dibutyltinmaleate as reaction accelerator, 0.25 parts by weight octadecyl-3-(3,5-di-ter-butyl-4-hydroxyphenyl) propionate as stabilizer.

Certain quantities of a reaction accelerator were added to the above mixture.

The EPT rubber was modified with hydroxyl groups by grafting 2-hydroxyethylmethacrylate (HEMA) in a 10% xylene solution of the EPT rubber.

The components were subsequently mixed for 20 minutes at a temperature of 180° C. or 200° C. and a speed of 35 rpm.

These examples illustrate the influence of different kinds and quantities of reaction accelerator on the properties of the blended polymer composition. The results are reported in Table 1.

The thus obtained moulding compounds were tested and the impact resistance (ASTM-D-256) rigidity (ASTM-D-790), unannealed HDT, (ASTM-D-648) were determined. The results are also reported in Table 1.

TABLE 1

| Example | SMA pts. wt | OH—EPT pts. wt | reaction accelerator pts. wt | reaction temp. °C. | impact resist. kJ/m$^2$ | rigidity N/mm$^2$ | HDT °C. |
| --- | --- | --- | --- | --- | --- | --- | --- |
| a | 45 | 15 | — | 200 | 2 | 1700 | 108 |
| 1 | 45 | 15 | 0.6 magnesium stearate | 200 | 18 | 1500 | 108 |
| 2 | 45 | 15 | 0.6 magnesium stearate | 180 | 22 | 1500 | 108 |
| 3 | 45 | 15 | 0.2 dibutyl-tinmaleate | 180 | 22 | 1480 | 108 |
| 4 | 45 | 15 | 0.6 zinc-stearate | 180 | 20 | 1500 | 108 |
| 5 | 45 | 15 | 0.6 aluminium-stearate | 180 | 17 | 1490 | 108 |
| 6 | 45 | 15 | 0.4 calcium-stearate | 180 | 19 | 1500 | 108 |
| 7 | 45 | 15 | 0.6 barium-stearate | 180 | 22 | 1500 | 108 |
| 8 | 45 | 15 | 0.6 tetra-butoxytitanium | 180 | 21 | 1520 | 108 |
| 9 | 45 | 15 | 1.2 copolymer of ethylene and acrylic acid neutralized with zinc | 180 | 9 | 1760 | 108 |

These examples clearly show that the moulding compounds produced according to the present process combine a superior impact resistance with a superior rigidity and dimensional stability under heat.

What is claimed is:

1. Process for preparing an impact resistant and U.V. resistant thermoplastic moulding compound based on a copolymer consisting of styrene and/or α-methylstyrene and maleic anhydride comprising mixing:
 (A) about 50 about 95 wt. % of a copolymer consisting of:
  (i) about 50 to about 95 wt. % styrene and/or α-methylstyrene,
  (ii) about 50 to about 5 wt. % maleic anhydride,
  (iii) 0 to about 20 wt. % acrylate, (iv) 0 to about 20 wt. % acrylonitrile;
(B) about 5 to about 50 wt. % of a rubber selected from the group consisting of:
a rubber modified with hydroxyl groups, said modified rubber being obtained by grafting thereto, by solution polymerization, a compound having hydroxyl groups selected from the group consisting of 2-hydroxyethylacrylate, 2-hydroxypropylacrylate, 2-hydroxyethylmethacrylate, 2-hydroxypropylmethacrylate, allyl alcohol and vinyl benzyl alcohol, the hydroxyl modified rubber containing about 0.05 to 10 wt. of hydroxyl groups,
a rubber modified with amine groups, said modified rubber being obtained by grafting thereto, by solution polymerization, a compound having amine groups, and
a rubber modified with amide groups, said modified rubber being obtained by grafting thereto, by solution polymerization, a compound having amide groups; and
(C) about 0 to about 30 wt. % unmodified rubber, wherein said rubber is ethylene-propylene rubber, ethylene-propylene-diene rubber, polyacrylate, polybutyldiene, polybutylene, polyethylene-vinyl acetate or a mixture thereof;
said mixing being conducted in the presence of about 0.01 to about 10 parts by weight of a reaction accelerator, calculated on 100 parts by weight copolymer and modified rubber, at a temperature between about 160° C. and about 290° C. wherein said reaction accelerator is (a) an organic metal compound, the metal component of which is a group II, III and/or IV metal or (b) an organometal compound.

2. Process according to claim 1, wherein said reaction accelerator is a salt of a groups II and/or III metal and a saturated or unsaturated fatty acid with 10 to 20 carbon atoms.

3. Process according to claim 1, wherein said reaction accelerator is magnesium stearate, calcium stearate, cadmium stearate, barium stearate, aluminum stearate and/or zinc stearate.

4. Process according to claim 1, wherein said reaction accelerator is an organo metal compound, the metal component of which is a metal from group IV, and an oxygen containing organic compound.

5. Process according to claim 4, wherein said reaction accelerator is dibutyltinmaleate and/or tetrabutoxytitanium.

6. Process according to claim 1, wherein said copolymer contains about 65 to about 90 wt. % styrene and about 10 to about 35 wt. % maleic anhydride.

7. Process according to claim 1, wherein said average molecular weight of said copolymer consisting of styrene and maleic anhydride is between about 30,000 and about 500,000.

8. Process for preparing an impact resistant and U.V. resistant thermoplastic moulding compound based on a copolymer consisting of styrene and/or α-methylstyrene and maleic anhydride by mixing:
(A) about 50 about 95 wt. % of a copolymer consisting of:
(i) about 50 to about 95 wt. % styrene and/or α-methylstyrene,
(ii) about 50 to about 5 wt. % maleic anhydride,
(iii) 0 to about 20 wt. % acrylate,
(iv) 0 to about 20 wt. % acrylonitrile;
(B) about 5 to about 50 wt. % of a rubber selected from the group consisting of:
a hydroxyl modified ethylene propylene rubber or ethylene-propylene-diene rubber having about 0.05 to about 10 wt. of hydroxyl groups, said modified rubber being obtained by grafting thereto, by solution polymerization, a compound having hydroxyl groups selected from the group consisting of 2-hydroxyethylacrylate, 2-hydroxypropylacrylate, 2-hydroxyethylmethacrylate, 2-hydroxypropylmethacrylate, allyl alcohol and vinyl benzyl alcohol,
(C) about 0 to about 30 wt. % unmodified rubber;
said mixing being conducted in the presence of about 0.01 to about 10 parts by weight of a reaction accelerator, calculated on 100 parts by weight copolymer and modified rubber, at a temperature between about 160° C. and about 290° C. wherein said reaction accelerator is an organic metal compound, the metal component of which is a group II, III and/or IV metal or an organometal compound selected from the group consisting of magnesium stearate, calcium stearate, barium stearate, dibutyl tin maleate, tetrabutoxy titanium, and copolymer of ethylene and acrylic acid at least partially neutralized with zinc.

9. The process according to claim 8 wherein in said process about 5 to about 20 wt. % said unmodified rubber is used.

* * * * *